(12) United States Patent
Hessler

(10) Patent No.: US 9,990,489 B2
(45) Date of Patent: *Jun. 5, 2018

(54) SYSTEM AND METHOD FOR PEER TO PEER MOBILE CONTEXTUAL AUTHENTICATION

(71) Applicant: LIVEENSURE, INC., Westminster, CO (US)

(72) Inventor: Christian Hessler, Westminster, CO (US)

(73) Assignee: LIVEENSURE, INC., Westminster, CO (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/667,965

(22) Filed: Aug. 3, 2017

(65) Prior Publication Data

US 2017/0329955 A1 Nov. 16, 2017

Related U.S. Application Data

(63) Continuation of application No. 14/611,486, filed on Feb. 2, 2015, now Pat. No. 9,754,097.

(Continued)

(51) Int. Cl.
*G06F 21/44* (2013.01)
*H04L 29/06* (2006.01)
(Continued)

(52) U.S. Cl.
CPC .............. *G06F 21/44* (2013.01); *G06F 21/31* (2013.01); *H04L 9/32* (2013.01); *H04L 63/12* (2013.01); *H04W 12/06* (2013.01)

(58) Field of Classification Search
CPC ......... G06F 21/44; G06F 21/31; H04L 63/12; H04L 9/32; H04W 12/06
See application file for complete search history.

(56) References Cited

U.S. PATENT DOCUMENTS 6,993,658 B1 1/2006 Engberg et al.
7,174,031 B2 2/2007 Rhoads et al.
(Continued)

FOREIGN PATENT DOCUMENTS

EP EP2378451 10/2011
GB 2501069 A 10/2013
(Continued)

OTHER PUBLICATIONS

Kuan-Chieh et al., "A Novel User Authentication Scheme Based on QR Code", Journal of Networks, Aug. 2010, vol. 5, Academy Publisher, Taiwan http://ojs.academypublisher.com/index.php/jnw/article/view/0508937941/2055.

(Continued)

*Primary Examiner* — Darren B Schwartz
(74) *Attorney, Agent, or Firm* — Kevin Schraven; Anooj Patel; Hankin Patent Law, APC

(57) ABSTRACT

The system and method of the present disclosure is a contextual authentication system, comprising: an authentication server, which comprises a memory; and an authentication application, wherein said authentication application may be configured to be run on at least a primary personal computing device and one or more secondary personal computing devices. The devices are networked with each other and each other and the authentication server. The primary device may have a resource that may be shared with the secondary devices if the users of the secondary devices are able to properly provide a contextual authentication, as required by the primary device. If the secondary users cannot properly authenticate, then they are denied access. The server may make the determination.

16 Claims, 12 Drawing Sheets

Related U.S. Application Data

(60) Provisional application No. 61/942,989, filed on Feb. 21, 2014.

(51) Int. Cl.
  *H04L 9/32* (2006.01)
  *H04W 12/06* (2009.01)
  *G06F 21/31* (2013.01)

(56) References Cited

U.S. PATENT DOCUMENTS

| | | | |
|---|---|---|---|
| 7,237,117 B2 | 6/2007 | Weiss | |
| 7,805,372 B2 | 9/2010 | Weiss | |
| 7,806,322 B2 | 10/2010 | Brundage et al. | |
| 7,809,651 B2 | 10/2010 | Weiss | |
| 7,822,411 B2 | 10/2010 | Nakatani | |
| 7,870,599 B2 | 1/2011 | Pemmaraju | |
| 8,001,055 B2 | 8/2011 | Weiss | |
| 8,006,291 B2 | 8/2011 | Headley et al. | |
| 8,028,896 B2 | 10/2011 | Carter et al. | |
| 8,112,787 B2 | 2/2012 | Buer | |
| 8,150,108 B2 | 4/2012 | Miller | |
| 8,174,503 B2 | 5/2012 | Chin | |
| 8,181,234 B2 | 5/2012 | Natsuki | |
| 8,271,802 B2 | 11/2012 | Orsini et al. | |
| 8,448,238 B1 | 5/2013 | Gupta et al. | |
| 9,485,098 B1 | 11/2016 | Lepeshenkov | |
| 2003/0149874 A1* | 8/2003 | Balfanz | H04L 63/0492 713/168 |
| 2004/0012569 A1 | 1/2004 | Hara | |
| 2004/0139322 A1 | 7/2004 | Kaler | |
| 2004/0171399 A1 | 9/2004 | Uchida et al. | |
| 2005/0059379 A1* | 3/2005 | Sovio | H04L 63/0492 455/411 |
| 2006/0005025 A1 | 1/2006 | Okada et al. | |
| 2006/0161789 A1 | 7/2006 | Doughty et al. | |
| 2006/0236369 A1 | 10/2006 | Covington et al. | |
| 2007/0106892 A1 | 5/2007 | Engberg | |
| 2007/0133843 A1 | 6/2007 | Nakatani | |
| 2007/0168674 A1 | 7/2007 | Nonaka et al. | |
| 2008/0005576 A1 | 1/2008 | Weiss | |
| 2008/0098469 A1 | 4/2008 | Morijiri et al. | |
| 2008/0172725 A1 | 7/2008 | Fujii et al. | |
| 2009/0198618 A1* | 8/2009 | Chan | G06Q 20/02 705/66 |
| 2009/0292641 A1 | 11/2009 | Weiss | |
| 2010/0058060 A1 | 3/2010 | Schneider | |
| 2010/0191967 A1 | 7/2010 | Fujii et al. | |
| 2011/0007901 A1* | 1/2011 | Ikeda | H04B 5/02 380/270 |
| 2011/0016320 A1 | 1/2011 | Bergsten et al. | |
| 2011/0219427 A1 | 9/2011 | Hito et al. | |
| 2012/0016731 A1 | 1/2012 | Smith et al. | |
| 2012/0066501 A1 | 3/2012 | Xiong | |
| 2012/0091202 A1 | 4/2012 | Cohen | |
| 2012/0095921 A1* | 4/2012 | Naono | G06Q 30/06 705/50 |
| 2012/0138679 A1 | 6/2012 | Doyle | |
| 2012/0204027 A1* | 8/2012 | Baek | H04L 9/321 713/155 |
| 2013/0219461 A1 | 8/2013 | Esaki et al. | |
| 2013/0246281 A1 | 9/2013 | Yamada et al. | |
| 2014/0279508 A1* | 9/2014 | Karamchedu | G06Q 20/3224 705/44 |
| 2015/0127733 A1* | 5/2015 | Ding | H04W 4/08 709/204 |
| 2015/0149777 A1* | 5/2015 | Kim | H04L 63/0853 713/169 |
| 2016/0127341 A1* | 5/2016 | Yan | H04L 63/0407 726/9 |

FOREIGN PATENT DOCUMENTS

| | | |
|---|---|---|
| WO | WO/1995/024696 | 9/1995 |
| WO | WO/2000/075760 | 12/2000 |
| WO | WO/2002/041114 | 5/2002 |
| WO | WO/2004/008683 | 1/2004 |
| WO | WO/2012/069845 | 5/2012 |

OTHER PUBLICATIONS

Madsen, Paul E., "QR codes for two-factor authentication", Nov. 22, 2005. http://connectid.blogspot.com/2005/11/qr-codes-for-two-factor-authentication.html.

Starnberger, Guenther. et al., "QR-TAN: Secure Mobile Authentication", 2009 International Conference on Availability, Reliability and Security, Vienna University of Technology, Institute of Information Systems, Vienna, Austria https://guenther.starnberger.name/publications/ares09_qrtan.pdf.

Dodson, Ben et al., "Snap2Pass: Consumer Friendly Challenge-Response Authentication with a Phone", Stanford University Security Workshop, Apr. 30, 2010. http://forum.stanford.edu/events/2010slides/security/BenDodson.pdf.

The International Searching Authority, Notification of Transmittal of the International Search Report and the Written Opinion of the International Searching Authority for International Application PCT/US13/32405; dated Jun. 3, 2013, 1 page, United States.

The International Searching Authority, International Search Report for International Application PCT/US13/32405, dated Jun. 3, 2013, 2 pages, United States.

The International Searching Authority, Written Opinion of the International Searching Authority for International Application PCT/US13/32405, dated Jun. 3, 2013, 4 pages, United States.

The International Searching Authority, PCT Recordation of Search History for International Application PCT/US13/32405, dated May 20, 2013, 33 pages, United States.

Dodson, Ben, "2010 Security Workshop", Brochure, Apr. 30, 2010, Stanford University, United States.

Potoczny-Jones, Isaac, "Quick authentication using mobile devices and QR Codes", article, Galois, Inc., Jan. 5, 2011 http://corp.galois.com/blog/2011/1/5/quick-authentication-using-mobile-devices-and-qr-codes.html.

Gurintto, "Wave your phone at the screen to log in!", video, Youtube, Inc., Feb. 15, 2011, http://www.youtube.com/watch?v=q717DSfWxto.

"Tiqr Mobile Authentication", product and video, Egeniq, Jan. 2010 http://www.egeniq.com/projects/tiqr/.

Balaji, N. Prasanna, "Web-Based System—Authentication to Single Log-on to Several Applications" International Journal of Computer Science and Telecommunications, Journal, Oct. 2011, India.

"QR code management service", article, Drupal, Nov. 12, 2009 http://drupal.org/project/d2c.

"Open Sesame App: Use smartphones to securely authenticate through the back door", article, halfbakery.com, Feb. 15, 2011. http://www.halfbakery.com/idea/Open_20Sesame_20App.

Liu, Shiyang; "Anti-counterreit-System-Based on Mobile Phone QR Code and Fingerprint", journal, Intelligent Human-Machine Systems and Cybernetics (IHMSC), 2010 2nd International Conference on Aug. 2010, Dept. of Electron. Inf. & Eng., China Univ. of Geosci., Wuhan, China.

"Digital signature on paper", article, halfbaker.com, Nov. 12, 2009. http://www.halfbakery.com/idea/digital_20signature_20on_20paper.

"Welcome to shrewd ideas, web authentication systems", blog, idea blog, http://shrewdideas.co.uk, Jul. 2010. http://shrewdideas.co.uk/ideablog/?m=201007.

"Microsoft Tag: Device ID", product, Microsoft, Mar. 2010, United States http://tag.microsoft.com/developer/device-id.aspx.

"Mobile Phone Location Verifies: Proximity to Transact", product, xyverify.com, Jan. 3, 2012, United States http://www.xyverify.com/index.php.

Homepage, website, Iproof.com, Jun. 2011 http://www.iproof.com/.

(56) References Cited

OTHER PUBLICATIONS

"Highly secure authentication via smartphone and Quick Response Code", product and datasheet, Pirean, Jan. 2002. http://www.pirearicom/software/qryptologin/ http://www.pirean.com/pdf/Pirean_QRyptoLogin_Datasheet.pdf.
Logmote, product, Jul. 2012. http://www.logmote.com/index.html.
Betts, Bryan, "Vasco targets SMB security with two-factor authentication service", article, Apr. 24, 2012, United Kingdom. http://www.cloudpro.co.uk/cloud-essentials/cloud-security/3437/vasco-targets-smb-security-two-factor-authentication-service.
Nexus Mobile Banking, Product Datasheet, Jan. 2009. http://www.nexussafe.com/Global/pdf/product%20sheet/Nexus%20Mobile%20Everywhere/Nexus%20Mobile%20banking.pdf.
QRAuth, "Login to any website using QR Codes", product/service, Jan. 2012. http://www.computingobjects.com/qrauthinfo/.
"SnapTags: The Mobile Barcode for Brand Marketing", product/service, Apr. 2010. http://www.spyderlynk.com/.
Sonic Notify, product/service, Jan. 2011. http://sonicnotify.com/.
David, Bernardo Machado et al., "A Framework for Secure Single Sign-On", Article, Mar. 2009, Brazil.
Coleman, Jason, "QR Codes: What Are They and Why Should You Care?", 2011, Kansas State University, Kansas, United States.
Maritz, Adrian, "Secure Payments Using Mobile Device", Jan. 5, 2011, United States.
Dodson, Ben et al. "Secure, Consumer-Friendly Web Authentication and Payments with a Phone" Stanford University, Oct. 2010, Mobicase, United States.
Dodson, Ben et al. "The Junction Protocol for Ad Hoc Peer-to-Peer Mobile Applications" Stanford University, Dec. 2010, United States.

* cited by examiner

SYSTEM AND METHOD FOR PEER TO PEER MOBILE CONTEXTUAL AUTHENTICATION

CROSS-REFERENCE TO RELATED APPLICATIONS

This application is a Continuation of U.S. Non-Provisional patent application Ser. No. 14/611,486, filed on Feb. 2, 2015, titled "METHOD FOR PEER TO PEER MOBILE CONTEXT AUTHENTICATION", by Christian J. Hessler, the contents of which are expressly incorporated herein by this reference. U.S. Non-Provisional patent application Ser. No. 14/611,486 claims the benefit of U.S. Provisional Patent Application No. 61/942,989, filed on Feb. 21, 2014, titled "METHOD FOR MOBILE SECURITY CONTEXT AUTHENTICATION", by inventor Christian J. Hessler, the contents of which are expressly incorporated herein by this reference.

FIELD OF USE

The present disclosure generally relates to methods and systems for providing network security. In particular, the present disclosure relates to synchronous and asynchronous multi-factor verification of networked peers and their identities and contexts via mobile and/or wearable electronic computing devices for achieving powerful, private, and real-time mutual verification of the authentication context via a dynamic and stateless interrogation of certain facts and factors, including the peer users, devices, wearables, session, server, location, knowledge and behavioral factors.

BACKGROUND

The most commonly understood sector in the security/authentication field involves traditional user access from a fixed or mobile electronic computing device (such as, desktop, laptop, mobile, smart phone, tablet, handset, gaming device, remote control, etc.) to a website, application, service, display, server, and/or network via (1) a username and password, cookie, token, or other type of single-sign-on to identify the user and (2) then some additional method of verification through a second or third factor, out-of-band (OOB) message, shared secret, physical token, certificate, 2D code scan and/or near-field communication protocol.

Another commonly understood authentication/security system is synchronous peer-to-peer communication and interaction between two users from fixed or mobile electronic computing devices via chat, instant message, streaming audio conferencing, streaming video conferencing, gaming, social networking, transmission of resources, or data by email, SMS, or FTP.

Another commonly understood authentication/security system is the asynchronous access or distribution, download, and/or streaming of shared resources between or among two or more users on fixed or mobile electronic computing devices across intermediary cloud storage, social networks, blogs, websites, games, content providers, mobile apps, and the like.

Another commonly understood authentication/security system is the area of payments or the verification of a payment, consumption, download, interaction or approval by or for a user to another user for an asset or access to an asset, across a third-party payment system, requiring some level of entitlement or authorization.

In all of the above present security/authentication systems, the act of identification or direct authentication of one or more users, the computing device, the session, the website, application, server, location, asset and/or the context itself, is required.

Another commonly understood authentication/security system is the area of electronic wearable user authentication whereby a user donning a wearable device with appropriate sensors and communication capabilities can sense, verify, and report the authenticity of the wearer to him or herself, a session, another device, or a general contextual situation requiring such validation and authenticity for the purposes of allowing or denying physical access, digital access, consummation of a transaction, digital payment, file download, session access, login, file stream, mutual validation of another human and/or machine, access to or operation of an automobile or other equipment, devices, terminals or machines requiring verification for permission to access, engage, interact or operate.

The present disclosure covers a new, useful, and non-obvious system and method that overcomes the limitations known in the field of electronic authentication.

One of the limitations solved by the system and method of the present disclosure is that traditional user and mobile device authentication has not allowed for the ability for users to authenticate and authorize other users on mobile devices or wearable devices (sometimes collectively referred to herein as "personal computing devices") via direct or indirect networked communication or across shared third-party platforms like social networks, email, cloud storage and peer-to-peer e-commerce, streaming media sites, mobile devices, wearable devices, servers or payments without depending upon or requiring third party host cooperation and/or host service security platform interaction. Generally, it was either too costly or too cumbersome to scale and be adopted ubiquitously by the marketplace to protect users, sites, devices, and sessions in this manner or, alternatively, a lack of commercial permission prevented such capabilities from being possible. Authentication methods and systems prior to the present disclosure do not meet the security challenges modern hackers pose nor do they have the simplicity, usability, seamlessness, unobtrusiveness, or privacy demands that personal computing device users require. Contemporary multi-factor or two-factor solutions fail to recognize and exploit the fact that user security is a fabric, not a thread. They also ignore the fact that user identities belong to users, not sites, and the user must be able to control the security, including privacy and resources among peer to peer interactions, across host platforms. This ignorance of contextual realities among devices, sites, users, apps, and networks in business critical and social environments, as well as the costs and implementation details involved, leaves most solutions and the current references disclosing those solutions unable to meet the authentication security challenges at hand, and they offer no capabilities for users to verify other users who access or interact with their session, resources, content, and/or identity. Additional methods that attempt to collapse the acts of identification and authentication into a single process inherit the same liabilities as any other single point of failure of federated systems, regardless of the sophistication or novelty of the flow, and they still require participation by the third-party identity platforms. In addition, no solution provides the ability for peers to independently authenticate each other without the intercession of the host site, service, app or federation. The challenge involves the balance of the market need for real security advancement with innovative usability, privacy, scalability, and low cost. The growing market and the growing ecosystem of users, devices, internet-of-things, mobile transactions, and general digital trust lies with the crowd, not the cloud.

The ideal achievement or solution would be to design something to simply, accurately, securely, and privately authenticate a context of multiple layers of credentials or factors amongst peers users and devices, a server or service, a network, or a user on a fixed or personal computing device taking into account the location, proximity, relationship or association, behaviors, knowledge or attributes of any or all of the above. The structure of the authentication process may be peer-to-peer, client to server, server-to-server or hybrid architecture. The expectation of, and requirement for, privacy, usability, accuracy, simplicity, and strength is and should be the same in all scenarios.

The challenge is to accomplish this simple, mutual, contextual verification between or among users and their mobile devices without depending upon or exposing the process to the traditional security solution shortcomings, such as: cost, lack of privacy, lack of personal intent or voluntary control or influence, interception, replay, usability, reliance upon the user skill, encryption, obfuscation, information seeding, centralized administration, federated identity assumptions, presentation or combined submission and/or transmission of credentials across known or predictable channels, sequential and discrete inspection and evaluation of isolated credentials, unilateral authoritative decision making about the context result status and compliance, permission or participation from intermediary networks, sites, apps or protocols. Traditionally, discrete and private elements about the user, device or session had to be paired with their meanings (key-value pairs), encrypted and sent to a back-end server for verification against a stored copy of the same credentials—no matter how novel the route they take to process. This legacy capture-and-forward approach inappropriately collapses the independent notions of identification (self-reported) and authentication (externally verified) thus exposing the users' private identity information to capture, replay, prediction, theft or misuse in service of their verification—and is a poor candidate for a robust, socially aware, peer-to-peer solution.

A second challenge is to utilize the personal computing electronic device in a peer to peer security context for what is designed for and capable of: being an interactive extension to and participant within the context of the user, site/app and session authentication. Previous incarnations of "bring your own device" (BYOD) or personal computing device authentication treated the mobile computing device as simply a "capture and forward" apparatus. In other terms, the device is used to capture, decode and forward-on credentials, biometric data, keys or tokens, as opposed to participating in the context in a manner in which it is capable. Previous security systems and methods merely relegated the mobile device to be a camera and a hard-drive, a secure element storing obfuscated keys or simple cookies and forwarding them along to the back-end authoritative server for a standard password lookup and match approach. The present system may use authenticated reality, whereby a mobile device is used to interact with the "fabric" of the user, which may include the environment, location, proximity, behavior, and real-world context of the session in a manner that securely, privately and easily revolutionizes the traditional authentication process on a user to device, user to user and/or device to device manner.

A third challenge is to involve the user in a way never before accomplished with respect to their authentication. Previous systems and security solutions were seen as layers or cumbersome steps that had to be taken in the end-user security flow. Users had to respond to certain challenges, maintain custody of bespoke hardware or software credentials, tokens, keys, certificates or select recognizable visual, audible, mathematical or textual components from a number of interfaces and prompts directed by a singular site or per-host security policy. The user has never historically been in control of the complexity, sophistication, application, components, context or essence of their authentication credentials or process, but merely responsible for memorizing, keeping, and then regurgitating those components or steps at the request of the host website or application. The rise of user-side hacking along with the proliferation personal computing devices and expanding user-to-user interaction online, has resulted in a necessary shift away from host-server side, shared-secret, patriarchal view of authentication security, and towards a more interactive, user-focused approach. The user must have interactive control of the depth, manner, method, makeup, and personalization of their authentication security in a way that is stronger, contextual, and more effective than previous techniques, but also simpler, more elegant and highly usable. The system of the present disclosure provides this.

A fourth challenge is creating both a synchronous and asynchronous peer-based multi-factor authentication solution between or amongst end users on personal computing devices that affords users the ability to independently identify, authenticate, and authorize each other, shared resources, access, and/or identity across yet independent of third party platforms and network systems or identity protocols as an added layer of defense in depth, just as host sites and services have traditionally achieved. This level of control and trust achieved via a simple, seamless, mobile peer authentication mechanism would revolutionize the modern personal computing devices security space, giving identity power and privacy back to the end users to whom they belong and opening up infinite opportunities to trust, interact, transact, and protect an increasing amount of network, social, mobile, app and cloud-based activities, events, and capabilities.

A fifth and final challenge involves the Internet of Things (IoT) whereby users can also authenticate and trust other devices, users, and wearables on a peer-to-peer level, without intercession, permission, or participation from centralized platforms or a sole reliance on federated identity mechanisms to accomplish, authorize or officiate such verification. In a sense, the challenge is to achieve a truly orthogonal, democratized authentication based on dynamic, private, and interactive factors as well as digital and physical context verification, in real time, between and among user and device endpoints rather than prescriptive, centralized security policies and enforcement. This fabric of trust may operate alongside, over-and-above, or in lieu of existing identity security policy and technology. The present system is meant to supplement, complement, or replace existing systems from the peer to peer user or device perspective.

The sum of these challenges has generally represented the barrier to security ubiquity that has never been overcome by security systems prior to the present disclosure. The realization that there is not and has never been a single, successful, ubiquitous approach to interactive user authentication in the field speaks volumes to the shortcomings of previous security systems. There is no obvious and de facto technique adopted in the field of peer-to-peer personal computing devices multi-factor authentication that simultaneously solves the security, usability, and interactivity challenges listed herein above.

The solution or goal would be to achieve a successful peer-to-peer context verification and authentication of all parties and factors while remaining immune to threats, hacks, interception, replay, compromise, prediction, collusion, false results of any of the process and/or implementation liabilities, some of which are described above and regardless of, or in addition to, the authentication security policies of intermediary sites, networks, platforms, or protocols. In addition, the secondary problems being solved are to embrace privacy, usability, achieve potential ubiquity with low-tech or no-tech integration and elevate the user's personal computing device to an interactive member of the authentication algorithm, not just an involuntary, passive scan, ping, push, probe, and/or decode and forward component in the flow, while giving the peer users additional voluntary, direct, and personal control over their security via self-selected and "performed" location/behavior/custom factors, independent from and/or above native platform security requirements.

Although there are many generally relevant references within the security system field, these references tend to fall into a definable set of inadequate approaches dating back to the security notions from the early to mid-20th century. The advent of mobile technology has unleashed a series of innovations that utilizes the mobile sensing, processing, and transmission capabilities of the mobile computing devices. The relevant references embody these multi-purpose innovations within stale, well-known authentication paradigms, models of shared-secret, security by obscurity, and flat, non-context-aware, unidirectional processing, regardless of their out-of-band (OOB) characteristics or flow.

The following is a representative selection of relevant references that are inferior to the system and method of the present disclosure, have significant deficiencies, and fail to solve the problems solved by the system and method of the present disclosure.

| Application/Pat./Ser. No. | Title | Named Inventor |
|---|---|---|
| U.S. Pat. No. 8,156,332 | Peer-to-Peer Security Authentication Protocol | Simon, Steven Neil |
| U.S. Pat. No. 8,510,820 | System and method for embedded authentication | Oberheide, Jon; Song, Douglas, Goodman, Adam |
| WO 2000/075760 | Authentication to a Service Provider | Haruhiko Sakaguchi, others (Sony) |
| U.S. Pat. No. 7,870,599 B2 | Multi-channel device utilizing a centralized out-of-band authentication system (COBAS) | Ram Pemmaraju |
| U.S. Pat. No. 7,293,284 B1 | Codeword enhanced peer-to-peer authentication | Bartram, Linda Sawadsky, Nicholas |
| US 20110283337 A1 | Method and system for authenticating network nodes of a peer to peer network | Schatzmayr, Rainer |
| US 2011/0219427 A1 | Smart Device User Authentication | Hito, Gent Madrid, Tomas Restrepo |
| August 2010, Journal of Networks, Vol 5, No. 8 (PDF) | A Novel User Authentication Scheme Based on QR Code | Kuan-Chieh Liao, Wei-Hsun Lee |
| 2009 Fifth International Joint Conference on INC, IMS and IDC | A One-Time Password Scheme with QR-Code Based on Mobile Phone | Kuan-Chieh Liao, Wei-Hsun Lee, others |
| http://connectid.blogspot.com/2005/11/qr-codes-for-two-factor-authentication.html (2005) | QR Codes for Two-Factor Authentication | Madsen, Paul E. |
| US 2004/0171399 A1 | Mobile Communication Terminal, Information Processing Method, Data Processing Program, And Recording Medium | Motoyuki, Uchida, others |
| 2009 International Conference on Availability, Reliability and Security | QR-TAN: Secure Mobile Authentication | Guenther Starnberger, others |
| Stanford University Security Workshop, Apr. 30, 2010 (published) | Snap2Pass: Consumer Friendly Challenge-Response Authentication with a Phone (QR) | Ben Dodson, Debangsu Sengupta, Dan Boeh, Monica S. Lam |
| U.S. Pat. No. 8,181,234 B2 (May 15, 2012) | Authentication System in Client-Server System And Authentication Method Thereof | Natsuki, Ishida (Hitachi) |
| WO 2004/008683 | Automated Network Security System Method | Engler, Haim |
| U.S. Pat. No. 8,943,306 | Methods, systems, and computer readable media for designating a security level for a communications link between wireless devices | Martin, et al. |
| 8,942,733 | System and method for location based exchanges of data facilitating distributed location applications | Johnson, William |

These relevant references have relied upon four primary modes of authentication above username/password, single-sign-on (SSO), or federated peer-to-peer identification:

seed and read (store credential, certs on device and reference upon subsequent authorization)

scratch and match (script-based dynamic browser/device recognition, cookies)

ring and ping (out-of-band, one-time passwords or tokens, shared secrets, PINs)

sense, decode, and forward (QR-code or 2D image, sound or other sensing-based model to capture code, match with seeded credential and forward to back-end server for lookup and match)

In addition, generally relevant references have also relied on traditional, yet insufficient, methods to approach peer-related authentication functionality, such as:

three-party system approaches whereby users trust of other users comes at the behest of the centralized authority to dole and dictate simulated peer-to-peer communication or trust, when the actual verification is merely a mediated experience based on pre-existing policy peer-to-peer validation that only functions synchronously, as opposed to asynchronously, and depends solely upon the host site security policies, identity mechanisms and verification capabilities peer-to-peer authentication that relies upon pre-trusted, pre-seeded fixed endpoints, or synchronous verification of digital certificates or session sockets, not content Specifically, the shortcomings of the references listed herein above fall under these areas:

no user control over peer authentication initiation, process, or flow no peer-to-peer capability for validation, verification, and authorization no independent, asynchronous authentication capabilities across third-party networks user reliance upon the host identity mechanisms and policies to trust other users no user to initiation of the trust event without host participation or permission no ability for a user to independently authenticate another user or user's device requires out-of-band mechanisms to deliver one-time-codes to yet untrusted devices All of the numerous embodiments disclosed in the relevant references have failed to adequately resolve the present security needs as evidenced by the ongoing and often times successful security attacks. In addition, the solutions proposed in the relevant references fail to solve the following problems, aloo of which are solved by the system and method of the present disclosure, namely:

(a) authentication is traditionally shared secret, static, and subject to interception, replay or prediction based on persistent information obfuscated by encryption or session flavoring;

(b) authentication security is expensive, cumbersome, difficult for users to understand or use;

(c) authentication relies on obfuscation, encryption, user skill or secrecy to be effective;

(d) credentials are usually fixed, sequential, and single-mass in depth, intelligence and context;

(e) security information flows backwards, over primary, predictive or known channels such as the browser, together as key-value pairs, towards the unilateral authority in the process;

(f) authentication decisions rely upon a unilateral observation, interrogation, lookup-match;

(g) secret data is often delivered over secure OOB channels, only to have the user or device erroneously re-insert that data back over the primary, unsecured channel for verification;

(h) secret OOB data is often sent to re-establish authentication, but arrives via email or SMS to a device that may be in the wild, compromised but still able to receive such data (i) user assumes all risk/responsibility, but has no control over enhancing, modifying, or improving security over and above what the authoritative source requires or allows;

(j) security requires re-identification or the user, mixing credentials in the channel;

(k) authentication security is risky when using a mobile device whose integrity is unknown;

(l) to date, there has been no ubiquitous solution to offer defense-in-depth authentication on top of username/password, single-sign-on (SSO), or federated identity management;

(m) defense-in-depth is often relegated to additional passwords or secrets;

(n) wearable solutions represent only store and forward, secure-element based validation;

(o) the lack of contextual approaches whereby all factors are simultaneously assessed as a composite signature, without revealing the underlying components or data;

(p) template approaches have been static containers for traditional literal factor gathering; and (q) no private, autonomous, asynchronous peer-to-peer verification and authentication mechanisms via mobile devices exists before the present disclosure or have been supported by references prior to the present disclosure.

Specifically, solutions proposed in the relevant references attempting peer-to-peer authentication across fixed or mobile devices, namely U.S. Pat. No. 8,156,332 (Simon) and the like, are insufficient due to the following limitations and inferior methods:

(a) reliance upon static, embedded credentials on the remote mobile devices;

(b) reliance upon fixed, known or pre-trusted and registered endpoints;

(c) lack of peer control to initialize authentication without central host site or service;

(d) static interrogation of fixed or pre-seeded credentials on devices to achieve authentication; and (e) lack of consideration of the power and capability of the peer mobile devices.

Furthermore, solutions proposed in the relevant references using encoded Quick Response (QR) images and mobile device scanning to identify or authenticate a user or device, shown, for example in U.S. Published Patent Application No. 2011/0219427 (Hito, Madrid) and the like, are insufficient due to the following limitations and inferior methods:

(a) reliance upon heavily encoded, encrypted, or obfuscated content within the image or code;

(b) reliance upon expensive, static, seeded, embedded credentials on the mobile device;

(c) reliance on a separate set of those credentials above (b) being deployed, seeded, managed;

(d) unidirectional flow of object scan to transmit towards the authoritative back end;

(e) the store-and-forward approach denies the process interaction and richer context;
(f) the reliance on code encryption requires equal and opposite decryption;
(g) co-mingling of identity and authentication data provides numerous opportunities hack;
(h) improper triangulation, interrogation, measurement and interdependent decision making with respect to the source, integrity and status of the authentication context; and
(i) failure to engage the user, device, session context, location, behavior factors.

Thus, what is needed is a security method and system that overcomes the deficiencies in the systems currently available. The system and method of the present disclosure solves these problems and represents new, useful, and not obvious innovation in the space of peer-to-peer authentication on a personal computing device.

SUMMARY

To minimize the limitations in the prior art, and to minimize other limitations that will become apparent upon reading and understanding the present specification, the system and method of the present disclosure provides a new and useful method and system for achieving strong, private, definitive and real-time verification and authentication of the context of peer users and electronic computing devices by verifying the context of the users via their personal computing devices, site/session, app, server, location, knowledge and behavioral attributes within a defined session from across a network. The solution innovates a defense-in-depth scenario whereby the system and method of the present disclosure provides a user initiated and controlled layer of peer-to-peer multi-factor authentication on top of existing native identity management facilities or enforcement. The system and method of the present disclosure achieves this goal by employing the following four new components:
(1) Real-time, private, mutual context verification from multiple perspectives
(2) Mobile and cloud triangulation of digital and physical location and proximity
(3) Holistic and contextual computation and assessment of underlying authentication factors
(4) User-driven, additive authentication security enhancement, with interactive, personal control
(5) User-initiated verification of other users' authenticity via personal computing devices.

An embodiment of the system and method of the present disclosure in practice is a user on a mobile device (personal computing device) who wishes to authenticate another user on another mobile device, whether via synchronous session connection (chat, stream, email, app to app) or asynchronous access permission to a shared resource (cloud storage file, social network content, commerce event, other asynchronous access). The first user may configure, tag, embed, or initiate the session, content, or event, which is targeted for a specific user or group of users, on a host from their computer, personal computing device, or other type of electronic data processing unit device over a browser or app. The second user then responds to the session initiation, receives, encounters, or consumes the targeted tagged or embedded content or event on their electronic data processing unit (or personal computing device) via a browser or an app. The second user's consumption or engagement triggers a call to the authentication server across a private communication channel with a request to authenticate the second user and the authentication server returns an object, such as a hyperlink, textual code, redirect, 2D image, or other object, to the second user's device for action and/or engagement by the second user. The second user's contextual responses are sent back to the authentication server and are either accepted or rejected. The authentication server may also create two random templates in memory, one for its own processing, and the other for consumption by the second user device. The server may present that link/object back to the second user over the host, app, session, or browser channel. The second user, on their device—which may be enabled with the authentication app—may consume the object, following it to retrieve its template directly, privately, and independently from the authentication server over a new discrete third channel, separate from the prior connection(s). The authentication server may independently and randomly interrogate elements about the session context (such as, host server, link/code object presentation location, user, device, location, any supplied credentials or cloud-stored algorithms about the user behavior, attributes or history) from its perspective and algorithmically fills its template to construct a bespoke, one-time context signature in memory. Simultaneously, the authentication app on the second user device randomly interrogates similar properties of the website, server, device (self), user and session from its perspective and independently populates its template to algorithmically construct a signature potentially correlating or conflicting with its signature counterpart constructed and saved to memory on the server. In addition, if configured and required, the user may perform certain behavioral actions like facing north, orienting the personal computing device in portrait mode, executing a touch or gesture, making a sound or motion, simply existing or being within a certain location, or performing a proximity (such as nearness to the authentication server, being close to a separate and valid wearable device, being near another user or users and their authenticated context or another device or fixed location point, which may also be interrogated in real-time and further modify the second user signature. Expected performance, location, proximity or other context data from a previous user or device registration event may create an expected and complementary modification of the algorithm on the authentication server side. Regardless of number, composition, and depth of the inputs (i.e. a multi-mass signature), the templates and signatures are preferably universally unique and distinct from each other and any other such objects that were used in the past or that will be used in the future. Preferably, the signature is not reused or replayed, only modified by new inputs, attributes and contexts. When completed, both the authentication server and the second user device mutually compare their respective one-time signatures over the third, private channel, bypassing the site, browser, calling app, and other (first) two channels. If they match, the entire context is mutually authenticated and the access us granted. If they fail to match, the mutual context is not authenticated and access is denied. In this manner, a secure, novel, and non-obvious security check is performed. No discrete or literal information or key-value pairs are captured or transmitted; only algorithmically applied comparisons, which are on both ends. The authentication server informs both users, and optionally the host, of the authentication status and the parties (or entitled events) proceed appropriately with that knowledge in hand. Preferably, all session components are destroyed in memory. Nothing persistent, or important, is stored, written, read, retrieved, or seeded to or from any personal computing device related to the authentication steps during any part of the process, and the peers have been properly authenticated.

The system and method of the present disclosure is superior to all relevant references in that its unique approach utilizes:

- Both synchronous and asynchronous peer-to-peer mobile device user authentication
- User-controlled authentication factor personalization: behavior, location, knowledge
- Algorithmic, template-based contextual fabric verification and authentication
- Mutual bespoke signature verification process and decision across all members
- No reliance upon cookies, certificates, public/private keys, shared secrets, biometrics
- No reliance on out-of-band codes or messages via SMS, email or push technology
- No exposure of seed or factor data, responses, values or meanings
- Triangulated, bi-directional data communication channel flows among parties
- Multi-perspective inspection and interrogation of session factors and contexts
- Automatic, real-time algorithmic processing on the authentication server and mobile device; no discrete data or credentials stored, seeded, managed or transmitted
- Dynamic enrollment and authentication across all of a user's mobile devices as opposed to device-by-device credential seeding, matching and association The system and method of the present disclosure is not obvious to one skilled in the art because no person or entity has successfully applied or reduced these concepts to practice or applied these notions of authentication separation, triangulation, contextual interrogation and equitable and mutual decision making in a space traditionally constrained by obfuscation, shared-secrecy and authoritative administration and assertion of credentials and verification.

Another embodiment may be a computer-based method of authenticating a first user on a primary electronic data processing unit (which may be a personal computing device) to a second user on a secondary electronic data processing unit (which may be a personal computing device), the steps comprising: providing a server, the server comprising a memory; providing the primary electronic data processing unit, the primary electronic data processing unit comprising a first application; providing the secondary electronic data processing unit, the secondary electronic data processing unit comprising a second application; providing an intermediate host, the intermediate host comprising a presentation, the intermediate host is networked with the primary electronic data processing unit and the second electronic data processing unit; initiating a direct connection between the primary electronic data processing unit and the secondary electronic data processing unit; creating, by the first application, one or more tagged resources associated with an authentication request object; sending, by the server, to the secondary electronic data processing unit the one or more tagged resources; presenting the one or more tagged resources to the secondary electronic data processing unit application; creating by the server, a first template and a second template in the memory; processing, by the server, the first template; processing, by the secondary electronic data processing unit, the second template; presenting, by the intermediate host via a second channel, the one or more tagged resources to the secondary electronic data processing unit; retrieving, by the secondary electronic data processing unit, the second template by following the one or more tagged resources, utilizing the secondary electronic data processing unit application to retrieve the second template independently of the server via a third channel, the third channel separate from the second channel; interrogating, by the server, a plurality of first contextual factors; populating, by the server, the first template based on the plurality of first contextual factors; constructing a one-time contextual server signature by the server based on the first template; interrogating, by the secondary electronic data processing unit application, a plurality of second contextual factors from a perspective of the secondary electronic data processing unit; populating, by the secondary electronic data processing unit application, the second template based on the plurality of second contextual factors; constructing, by the secondary electronic data processing unit application, a one-time contextual application signature based on the second template; and responsive to determining, by the server, the one-time contextual application signature matching the one-time contextual server signature: authenticating and granting access to the first user, and responsive to determining, by the server, the one-time contextual application signature failing to match the one-time contextual server signature: denying access to the first user. The direct connection initiated between the primary electronic data processing unit and the secondary electronic data processing unit to trigger the request to authenticate may be a synchronous network session between the primary and secondary electronic data processing units without involving the intermediate host. The step of retrieving by the secondary electronic data processing unit may be enabled via the secondary electronic data processing unit's ability to scan, sense, enter, input, consume or respond to the one or more tagged resources on the secondary electronic data processing unit directly from the server without involving the intermediary host. The step of retrieving by the secondary electronic data processing unit may be enabled via the secondary electronic data processing unit's ability to scan, sense, enter, input, consume or respond to the one or more tagged resources on the intermediate host. The step of receiving by the secondary electronic data processing unit may be enabled via the secondary electronic data processing unit's ability to connect directly with the server via the third channel, engage an active session, and consume and process the required authentication service object without scan, sense, enter, input or response to the one or more tagged resources on the intermediate host. The plurality of first contextual factors and the plurality of second contextual factors each may be selected from the group of contextual factors consisting of: a server, a user, a device, a wearable, a biometric, a location, a proximity, and a supplied credential. The primary electronic data processing unit and the intermediate host each may require an individual and discrete authentication with the secondary electronic data processing unit. The step of receiving by the secondary electronic data processing unit may be enabled via the secondary electronic data processing unit's ability to connect directly with the server via the third channel, engage the synchronous network session, and consume and process the required authentication service object without scan, sense, enter, input or response to the one or more tagged resources on the intermediate host. The plurality of first contextual factors and the plurality of second contextual factors each may be selected from the group of contextual factors consisting of: a server, a user, a device, a wearable, a biometric, a location, a proximity, and a supplied credential. The primary electronic data processing unit and the intermediate host each preferably requiring an individual and discrete authentication with the secondary electronic data processing unit.

One embodiment may be a contextual authentication system, comprising: an authentication server, which comprises a memory; and an authentication application, wherein the authentication application may be configured to be run on at least a primary personal computing device and one or more secondary personal computing devices; wherein the primary personal computing device and the one or more secondary personal computing devices may be networked with an intermediate host; wherein the intermediate host may comprise a presentation; wherein the presentation may comprise one or more tagged resources; wherein a direct connection may be initiated between the primary personal computing device and the one or more secondary personal computing devices; wherein the authentication application running on the primary personal computing device may create the one or more tagged resources associated with an authentication request object that requires one or more contextual authentications to be accessed; wherein the server may send to the one or more secondary personal computing devices the one or more tagged resources associated with the authentication request object; and wherein the authentication application on the one or more secondary personal computing devices may require one or more users to provide one or more provided contextual authentications in order for the one or more tagged resources to be accessed by the one or more secondary personal computing devices. The authentication server may receive the one or more provided contextual authentications and may determine whether the one or more provided contextual authentications are valid. If a particular provided contextual authentication is not valid, then the authentication server denies access to the one or more tagged resources. If a particular provided contextual authentication is valid, then the authentication server grants access to the one or more tagged resources. The one or more contextual authentications may be interactive. The one or more contextual authentications may be selected from the group of contextual authentications consisting of: device identification; a behavior; a touch; a gesture; proximity; and knowledge. The server may create a first template and a second template, which may be stored in the memory; wherein the server may process the first template; wherein the one or more secondary personal computing devices may each process the second template; wherein the intermediate host, via a second channel, may present the one or more tagged resources to the one or more secondary personal computing devices; wherein the one or more secondary personal computing devices may retrieve the second template by following the one or more tagged resources; wherein the second template may be retrieved independent of the server via a third channel; wherein the primary personal computing device may set the one or more contextual authentications; wherein the server may populate the first template based on the one or more contextual authentications, such that a one-time contextual server signature may be constructed by the server based on the first template; wherein the authentication application on the one or more secondary computing devices populates the one or more provided contextual authentications into the second template, such that a one-time contextual device signature may be constructed; and wherein the server may compare the one-time contextual server signature with the one-time contextual device signature and may determine whether to grant access to the one or more tagged resources. The one or more secondary personal computing devices may be enabled to retrieve the second template based on the one or more secondary personal computing devices' ability to scan, sense, enter, input, consume or respond to the one or more tagged resources on the intermediate host. The primary personal computing device and the intermediate host may each require an individual and discrete authentication with the one or more secondary personal computing device.

One embodiment may be a contextual authentication system, comprising: an authentication server, which may comprise a memory; and an authentication application, wherein the authentication application may be configured to be run on at least a primary personal computing device and one or more secondary personal computing devices; wherein the primary personal computing device and the one or more secondary personal computing devices may be networked with each other and with the authentication server; wherein the primary personal computing device may comprise one or more resources; wherein a direct connection may be initiated between the primary personal computing device and the one or more secondary personal computing devices; wherein the authentication application running on the primary personal computing device may tag one or more resources associated with an authentication request object that requires one or more contextual authentications; wherein the server may send to the one or more secondary personal computing devices the one or more tagged resources associated with the authentication request object; and wherein the authentication application on the one or more secondary personal computing devices may require one or more users to provide one or more provided contextual authentications in order for the one or more tagged resources to be accessed by the one or more secondary personal computing devices. The authentication server may receive the one or more provided contextual authentications and may determine whether the one or more provided contextual authentications are valid. If a particular provided contextual authentication is not valid, then the authentication server denies access to the one or more tagged resources. If a particular provided contextual authentication is valid, then the authentication server grants access to the one or more tagged resources. The one or more contextual authentications may be interactive. The one or more contextual authentications may be selected from the group of contextual authentications consisting of: device identification; a behavior; a touch; a gesture; proximity; and knowledge.

It is an object of the system and method of the present disclosure to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

LEXICON—Reference of Alpha-Numeric characters

Figure 1:
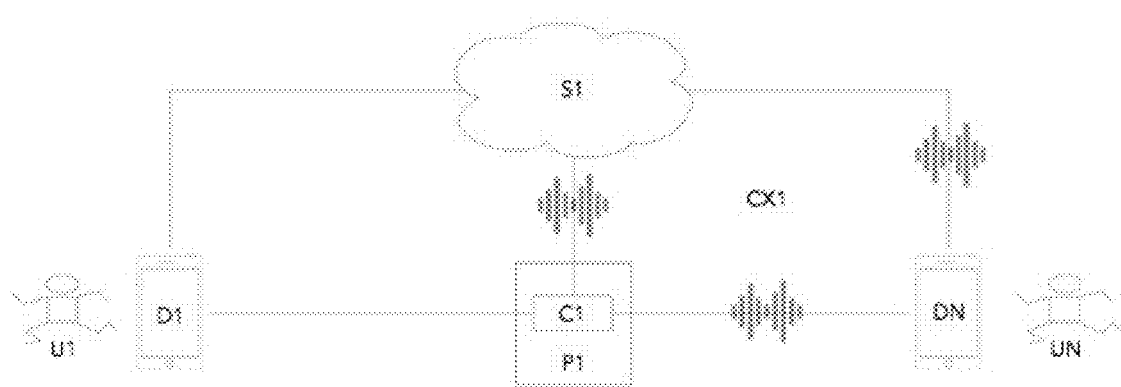
FIG. 1 is a functional flow-block diagram of one embodiment of a real-time, mutual authentication via mobile devices and the authentication server (S1) between two personal computing devices and their respective users, whereby a first user (U1/D1) challenges a second user (UN/DN) to contextually authenticate (CX1) via the authentication server (S1) to access shared content (C1) on host presentation (H1/P1), such as a social network or file sharing site.

| U = user | H/P = host and/or presentation | S = authentication server | Ch = challenge |
|---|---|---|---|
| CX = contextual authentication | D = personal computing device | L = location | R = response to challenge |
| C = content | | | |

In the following detailed description of various embodiments of the system and method of the present disclosure, numerous specific details are set forth in order to provide a thorough understanding of various aspects of one or more embodiments of the system and method of the present disclosure. However, one or more embodiments of the system and method of the present disclosure may be practiced without some or all of these specific details. In other instances, well-known methods, procedures, and/or components have not been described in detail so as not to unnecessarily obscure aspects of embodiments of the system and method of the present disclosure.

While multiple embodiments are disclosed, still other embodiments of the present system and method of the present disclosure will become apparent to those skilled in the art from the following detailed description, which shows and describes illustrative embodiments of the system and method of the present disclosure. As will be realized, the system and method of the present disclosure is capable of modifications in various obvious aspects, all without departing from the spirit and scope of the system and method of the present disclosure. Accordingly, the Drawings, and the detailed descriptions thereof, are to be regarded as illustrative in nature and not restrictive. Also, the reference or non-reference to a particular embodiment of the system and method of the present disclosure shall not be interpreted to limit the scope of the system and method of the present disclosure.

In the following description, certain terminology is used to describe certain features of one or more embodiments of the system and method of the present disclosure. For instance, "computer", "electronic data processing unit", "authentication server", or "server" refers to any device that processes information with an integrated circuit chip, including without limitation, mainframe computers, work stations, servers, desktop computers, portable computers, laptop computers, embedded computers, wireless devices including cellular phones, personal digital assistants, tables, smart phones, portable game players, wearable devices, embedded technology, IoT devices and hand-held computers. The term "internet" refers to any collection of networks using standard protocols, whether Ethernet, ATM, FDDI, Wi-fi, Token ring, Bluetooth, NFC, acoustic, optical or any combination thereof; and "website" refers to any document written in a mark-up language including, but not limited to, HTML (hypertext mark-up language) or VRML (virtual reality modeling language), dynamic HTML, XML (extended mark-up language), WML, or any other computer languages related thereto, as well as to any collection of such documents reachable through one specific Internet Protocol Address or at one specific World Wide Web site, or any document obtainable through any particular URL (Uniform Resource Locator); and "web page" (or "page"), "website" (or "site") refers to any of the various documents and resources on the World Wide Web, in HTML/XHTML format with hypertext links to enable navigation from one page or section to another, or similar such resources used on the internet.

The term "factor" refers to any factors, including multimass factors, during the main authentication session, including without limitation, personalized authentication context factors or personal factors (e.g., location factors, behavioral factors, biometric factors, knowledge, custom factors, proximity factors); elements or factors of the session context in the perspective of the server (e.g., host server, link/code object presentation location, user, device, location, any supplied credentials or cloud-stored algorithms about the user behavior, attributes or history); elements of the session context in the perspective of the device (e.g., elements of the website, server, device itself, user, and session, wearables and IoT devices); voluntary or involuntary behavioral actions of the user (e.g., facing north, orienting the mobile in portrait mode or executing a gesture, or "exist" within certain location or proximity attributes such as nearness to the server display screen or another device or fixed location point); and external factors such as one or more of an out-of-band personal identification numbers (PIN), passphrase, shared secret data, one-time-password or reused password, delivered via email, short message service (SMS), multimedia service (MMS), voice, physical token, or other human or computer mediated transmission outside of the primary security system communication paths.

The term "personal computing device" refers to any mobile or wearable electronic computing device, including, but not limited to smartphone, cellular phone, smart watch, tablet, laptop, mobile computer, handheld computer, gaming device, and the like.

The system and method of the present disclosure is preferably a peer-to-peer, multi-factor context authentication security method and system that uses one or more servers and one or more electronic computing devices (D) across a network and one or more contextual factors within a defined session to mutually authenticate one or more users (U) in context. One embodiment of the system and method of the present disclosure occurs when primary user wishes to authenticate one or more secondary user(s) for purposes of trust, authorization or access to a device, site, session, resource, app, payment or physical engagement on a particular server or host. The secondary user may access the entitled resource via a mobile app, server host, website or other connected device over a user channel from his or her mobile device, wearable or other type of electronic data processing unit device through a browser, app or physical proximity and engagement and preferably logs in using a traditional username/password, cookie, token or similar identity request, and/or single-sign-on identification step. The entitled resource on the server (S) or mobile device then preferably contacts the primary user across an alternate method such as a private communication channel with the request to authenticate. Alternatively, the primary user has already tagged or instrumented the entitled resource with the authentication policy, requirements to enable or trigger the authentication request from the simple engagement or access by the secondary user.

In response to either scenario, the requested, entitled resource on the server or mobile device preferably displays or transmits an object, such as a QR code, textual code, code object, or hyperlink to the secondary user and their device. The system and method of the present disclosure preferably creates two or more templates in its server memory (a first template for its own processing and a second template for the consumption by the mobile device or electronic data processing unit of the secondary user). Additionally, the website may generally presents an object or link object back to the secondary user over a presentation such as a browser channel. While using an application on his or her device, the secondary user selects or consumes the object by scanning, sensing, entering, inputting, or responding to the object. As a result, the application preferably follows the object to retrieve the second template directly, privately, and independently from the server over an alternative channel, which is preferably a new discrete third channel, separate from the user channel and host channel. The server then preferably populates the first template with contextual factors such as elements of the session context (e.g., host server, link/code object presentation location, user, device, location, any supplied credentials or cloud-stored algorithms about the user behavior, device attributes, proximity or history). Alternatively, the primary user may optionally inject one-time challenge factors or policy elements into the template from their mobile electronic computing device to increase the specificity or universality of the interrogation of the secondary user and their respective devices, behaviors, locations or knowledge. Using such contextual factors from the perspective of the server, the server may algorithmically populate the first template to construct a first signature (i.e., a one-time context signature in memory). Simultaneously, or approximately near the same time, the application on the device of the secondary user may randomly populate similar contextual factors from the perspective of the device using elements of the website, server, device itself, user, and/or session. This step preferably results with the device of the user independently populating the second template to algorithmically construct a second signature. The second signature may alternatively correlate or conflict with the first signature of the server. Furthermore, the user may perform certain voluntary or involuntary behavioral actions (e.g., facing north, orienting the device in portrait mode or executing a gesture, or "exist" within certain location or proximity attributes such as nearness to the server display screen or another personal computing device or fixed location point), which, may also be interrogated in real-time and further strengthen the second signature of the user. Any data from expected performance, location, proximity, or other contextual factors from a previous user or device, may create complementary modification of the algorithm on the server. Regardless of number, composition and depth of inputs (i.e., a multi-mass signature), the templates and signatures are preferably unique and distinct from each other and any other previous or future objects.

Preferably, the first and second signatures are not reused or replayed, but rather, modified by new inputs, attributes, and contextual factors. Upon completion of the creation the first and second signatures, the server and device preferably compare their respective signatures over the channel, bypassing the user channel (e.g., browser or calling app) and entitled resource access channel. If the first signature and second signature match, the entire context is preferably mutually authenticated. On the other hand, if the first signature and second signature fail to match, the mutual context is preferably not authenticated. Generally, no information or key-value pairs are captured or transmitted, but rather, algorithmically applied once at the server end and user end. The server preferably informs both users and devices the authentication status and, as a result, the parties may proceed appropriately, depending upon the results of the authentication. All session components are preferably destroyed in memory, and preferably no information is stored, written, read, retrieved or seeded to or from the device during any part of the authentication process.

FIG. 1 shows that the system and method of the present disclosure preferably achieves this synchronous or asynchronous mutual authentication described above between two personal computing devices and their users whereby the first, authenticating user (U1) from a personal computing device (D1) challenges one or more secondary users (UN) to authenticate the one or more secondary users (UN) via a contextual authentication (CX1) via the authentication server (S1) to access shared secured content (C1) on host presentation (P1), via their personal computing device(s) (DN). The first user (U1) preferably tags or configures resources from their device (D1) to require authentication by one or more other users (DN) for access, engagement, consumption, modification or interaction. User (U1) preferably transmits the tagged resource (C1) from their device (D1) to user(s) (UN) on their device(s) (DN). Alternatively, the first user (U1) preferably posts or hosts the tagged resource (C1) on an intermediary host (P1) such as a website, social network, email server, blog, or even physically printed or rendered medium. Per the configuration by user (U1) the secondary user(s) (UN) on device(s) (DN) preferably cannot obtain permission to engage or consume resource (C1) without successfully completing a contextual authentication (CX1) to user (U1) via their device (DN) by utilizing the authentication server (S1).

Upon consumption or engagement attempt of resource (C1) on host (P1) by the one or more secondary users (UN) on one or more devices (DN) from across the primary web communication channel, preferably secured resource (C1) or user (U1) on device (D1) signals the authentication server (S1) over the secondary host channel requesting authentication of user(s) (UN) and device(s) (DN). The authentication server (S1) returns a response object to either device (D1) and/or content (C1) on host (P1) for consumption, transmission or display to user(s) (UN) and/or device(s) (DN) over the web channel. From this point, user(s) (UN) use the device(s) (DN) to complete (shown in FIG. 12 as detailed below) the authentication process, including, in some embodiments, templated factor interrogation, triangulation, validation, and eventual context authenticity decision steps between and among the authentication server (S1), user(s) (UN) and device(s) (DN) over the third, private smart communication channel, simultaneously measuring device (DN) identity, device (DN) location (FIG. 9), device (DN) proximity (FIG. 8), user (UN) and device (DN) orientation (FIG. 10), user (UN) and device (DN) behavior, touch or gesture, biometric challenge (FIG. 11), and/or user (UN) knowledge challenge and response (FIG. 7), are preferably synonymous with those specified in the detailed description and FIGS. 1-6 of the system disclosed in U.S. Pat. No. 8,935,769, which shares common inventorship with the present disclosure, the contents of which are expressly incorporated herein by reference as though set forth in its entirety. The resultant contextual authentication (CX1) (if valid) results in user(s) (UN) on device(s) (DN) preferably obtaining approval (or denial if invalid) to proceed, access, engage, or interact with the original resource (C1) hosted on (P1), as detailed by in FIG. 12.

Figure 2:
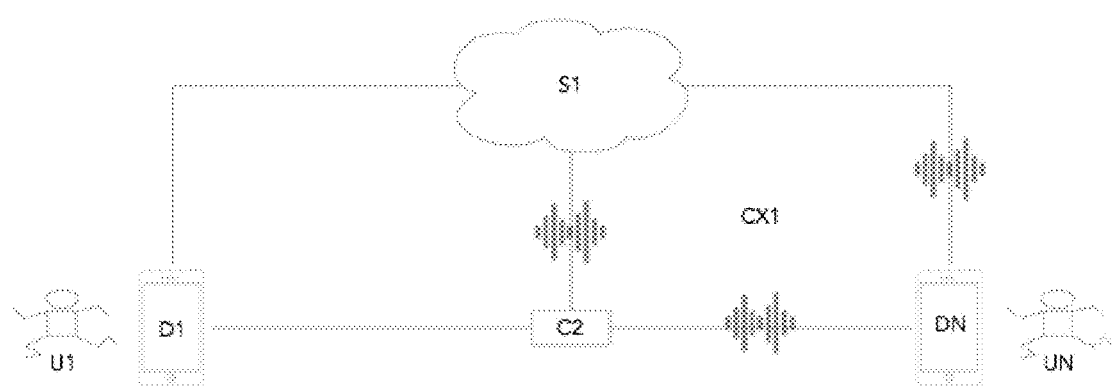
FIG. 2 is a functional flow-block diagram of another embodiment of a real-time, mutual authentication via personal computing devices and the authentication server (S1) between two personal computing devices and their users whereby a first user (U1/D1) challenges a second user (UN/DN) to contextually authenticate (CX1) via the authentication server (S1) to engage in a shared connection (C2) directly between devices, such as app to app, chat, file sharing, streaming, messaging, VOIP, synchronous or asynchronous data sharing, physical access, in-person recognition, or real-time application program interface (API) interaction.

FIG. 2 shows how the present security system achieves a synchronous or asynchronous, mutual authentication between two mobile devices and their users, wherein the first, authenticating user (U1) from a personal computing device (D1) challenges one or more secondary users (UN) to complete a contextual authentication (CX1) via the authentication server (S1) to access shared secured connection or content (C2) directly between their fixed or mobile electronic computing devices (D1) and (DN) over a peer channel. The first user (U1) preferably tags or configures resources or connection request (C2) from their device (D1) to require authentication by one or more other users (UN) for access, engagement, consumption, modification, or interaction. User (U1) preferably transmits the tagged resource (C2) from their device (D1) to user (UN) on their device (DN) over a peer channel. Alternatively, the first user (U1) preferably transmits the tagged resource or connection request (C2) through an intermediary host or service such as VOIP, chat, email, streaming, or API protocol to the one or more secondary devices (DN). Also alternatively, the secondary users (UN) on one or more personal computing devices (DN) may initiate the request to access, connect, consume, or engage the initial user (U1) on device (D1), either directly or via an intermediary host, protocol, or service over a segmented peer channel. Per the configuration by user (U1) the alternate users (UN) on devices (DN) preferably cannot obtain permission to engage, consume, or connect with the resource or connection (C2) or user (U1) on device (D1) without successfully completing the contextual authentication (CX1) required by user (U1) via their device (DN) by utilizing the authentication server (S1).

Upon consumption or an engagement attempt of the secured resource or connection (C2) by one or more secondary users (UN) on device(s) (DN) from across the primary peer communication channel, resource or connection (C2) or user (U1) on device (D1) may signal the authentication server (S1) over the secondary private channel requesting contextual authentication of user(s) (UN) and/or device(s) (DN). The authentication server (S1) preferably returns a response object to content or connection (C2) on either device (D1) or device (DN) over the private, secondary channel for consumption, transmission or display to user(s) (UN) on device(s) (DN) over the peer channel. From this point, user(s) (UN) use the device(s) (DN) to complete (shown in FIG. 12 as detailed below) the authentication process, including, in some embodiments, templated factor interrogation, triangulation, validation, and eventual context authenticity decision steps between and among the authentication server (S1), user(s) (UN) and device(s) (DN) over the third, private smart communication channel, simultaneously measuring device (DN) identity, device (DN) location (FIG. 9), device (DN) proximity (FIG. 8), user (UN) and device (DN) orientation (FIG. 10), user (UN) and device (DN) behavior, touch or gesture, biometric challenge (FIG. 11), and/or user (UN) knowledge challenge and response (FIG. 7), are preferably synonymous with those specified in the detailed description and FIGS. 1-6 of the system disclosed in U.S. Pat. No. 8,935,769, which shares common inventorship with the present disclosure, the contents of which are expressly incorporated herein by reference as though set forth in its entirety. The resultant contextual authentication (CX1) (if valid) results in user(s) (UN) on device(s) (DN) preferably obtaining approval (or denial if invalid) to proceed, access, engage, or interact with the original resource (C1) hosted on (P1), as detailed by in FIG. 12.

Figure 3:
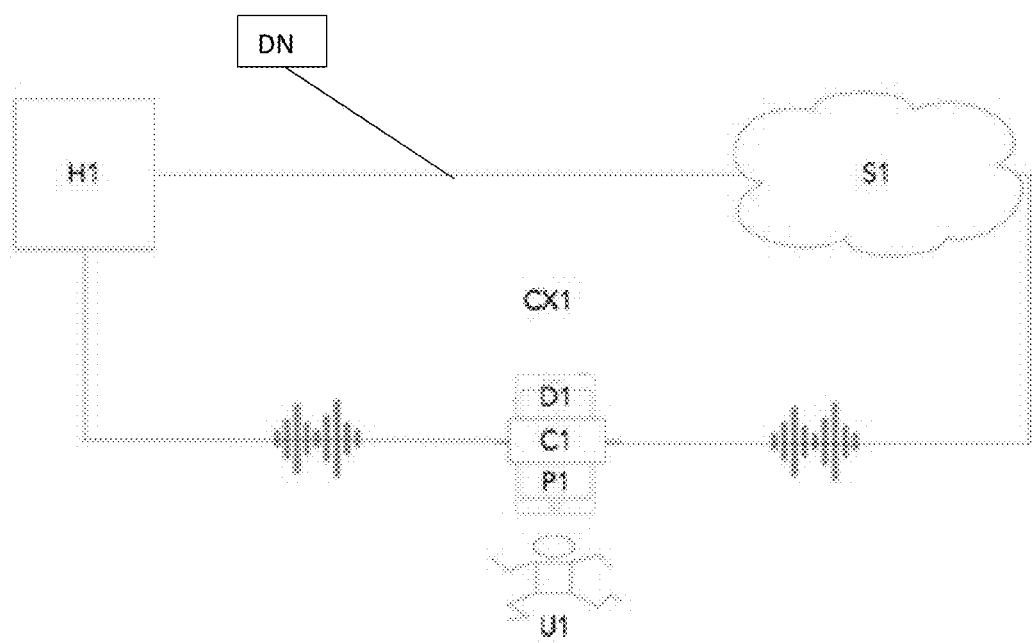
FIG. 3 is a functional flow-block diagram of another embodiment of a real-time, mutual authentication via personal computing devices and the authentication server (S1) whereby a primary host (H1) challenges an end user (U1/D1) to contextually authenticate (CX1) via the authentication server (S1) to access content (C1) presented (P1) directly within the mobile device (D1) inside an app or mobile browser, without a secondary host as presentation (P1) intermediary to be scanned.

FIG. 3 shows the one or more secondary users (UN) on one or more personal computing devices (DN) optionally engages the secured content, resource, or connection (C1) directly on their personal computing device(s) (DN) from intermediary host (H1), preferably without requiring or involving presentation layer (P1) or a direction connection to primary device (D1). In this embodiment, the request for contextual authentication, via the secondary private channel to the authentication server (S1) is initiated by host (H1), the consumption of the authentication template and ensuing authentication process may be transmitted over a third, smart channel, all of which occurs directly between secondary device (DN) and the authentication server (S1). FIG. 3 shows that the content (C1) is presented (P1) on the personal computing device (D1) of user (U1).

Figure 6:
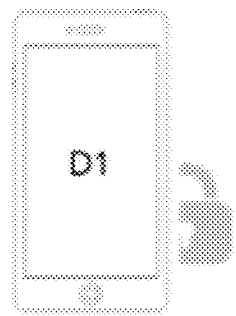
FIG. 6 is an illustration of an example of a personal computing device (D1), which may be an interrogating device.
Figure 7:
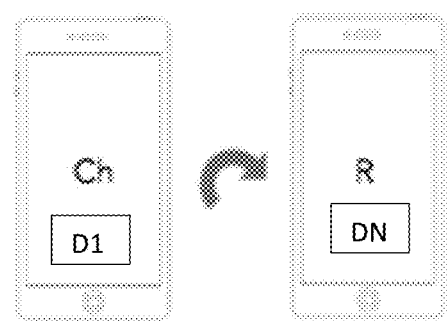
FIG. 7 is an illustration of an example of personal computing device (D1), which may send challenge (Ch) to a second personal computing device (DN) that provides a response (R) to the challenge.

From this point, the contextual authentication (shown in FIG. 12), including templated factor interrogation, triangulation, validation and eventual context authenticity decision steps between and among the authentication server (S1), secondary user(s) (UN) and one or more personal computing device(s) (DN) over the third, private smart communication channel, simultaneously measuring device(s) (DN) identity (FIG. 6), device(s) (DN) location (FIG. 9), device(s) (DN) proximity (FIG. 8), user(s) (UN) and device(s) (DN) orientation (FIG. 10), user(s) (UN) and device(s) (DN) behavior, touch, or gesture (FIG. 11), and/or user(s) (UN) knowledge challenge and response (FIG. 7). The resultant contextual authentication (CX1) is approved if correct or denied if not correct. If approved, the user(s) (UN) may proceed, access, engage or interact with the original resource (C1).

Figure 4:
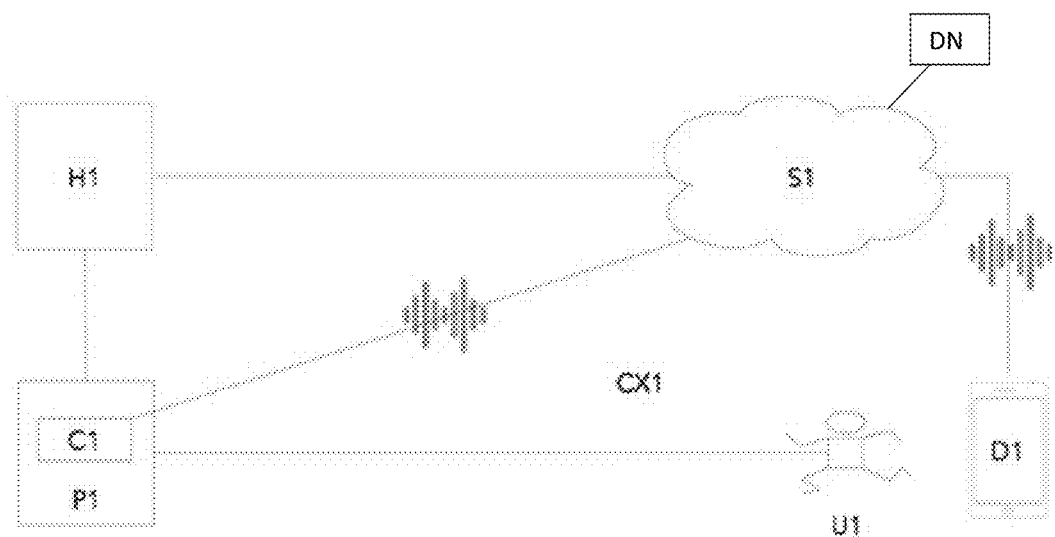
FIG. 4 is a functional flow-block diagram of another embodiment of a real-time, mutual authentication via mobile devices and the authentication server (S1) whereby one host (H1) challenges an end user (U1/D1) to contextually authenticate (CX1) in order to access content (C1) presented (P1) while user and device (U1/D1) independently engage the authentication server (S1) to consume, interrogate and authenticate the session context (CX1) to gain access to content (C1) without scanning or connecting to (P1).

FIG. 4 shows that in one embodiment the one or more secondary users (UN) via one or more personal computing devices (DN) are not directly engaging the secured content (C1) on presentation layer (P1), but generally need to have an awareness of the content (C1) and that it requires authentication in order to access. User(s) (UN) may directly engage the authentication server (S1) from device(s) (DN) over the third, private channel to contextually authenticate (CX1) in order to independently access the resource or connection (C1). The primary user (U1) sets the required contextual authentication on the host (H1), rather than using the device (D). Furthermore, as shown in FIG. 4, the content C1 may be provided by the host (H1) and not by device (D1). The server (S1) may inform the user (U1) of the status by sending a notification signal to device (D1).

Figure 5:
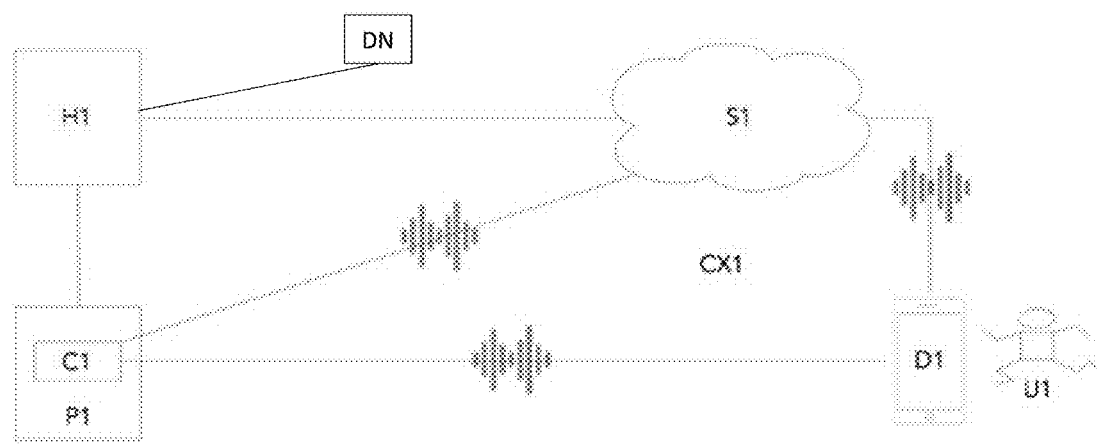
FIG. 5 is a functional flow-block diagram of another embodiment of a real-time, mutual authentication via mobile devices and the authentication server (S1) whereby one host (H1) challenges an end user (U1/D1) to contextually authenticate (CX1) to access content (C1) presented (P1) while user and device (U1/D1) consumes the authentication request object by scanning, sensing or entering into the app on (D1) to engage the authentication server (S1) to authenticate the session via contextually authenticate (CX1).

FIG. 5 shows that the actor for content (C1) displayed on (P1) is preferably host (H1) on behalf of user (U1) from device (D1). One or more secondary users (UN) on one or more personal computing devices (DN) encounter, engage, or attempt to consume or interact with the secured content or connection (C1) hosted on (H1) presented (P1) over the primary web channel. Upon such engagement, host (H1) requests that secondary user(s) (UN), via device(s) (DN) complete the context authentication with server (S1) over the secondary, private channel.

FIG. 6 is an illustration of an example of a personal computing device (D1), which may be an interrogating device.

FIG. 7 is an illustration of an example of personal computing device (D1), which may send challenge (Ch) to a second personal computing device (DN) that provides a response (R) to the challenge.

Figure 8:
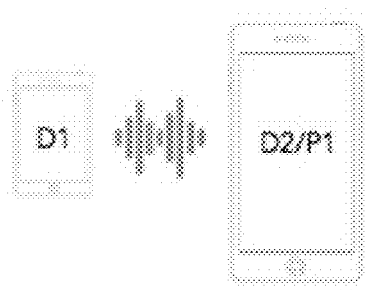
FIG. 8 is an illustration of an example of interrogating personal computing device (D1) and its proximity to another personal computing device (D2) or the presentation (P1) point for purposes of validating session proximity factor credentials.

FIG. 8 is an illustration of an example of interrogating personal computing device (D1) and its proximity to another personal computing device (D2) or the presentation (P1) point for purposes of validating session proximity factor credentials.

Figure 9:
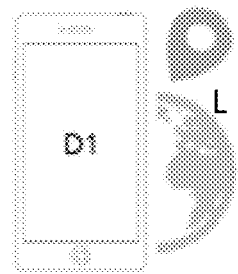
FIG. 9 is an illustration of an example of interrogating personal computing device (D1) absolute location (L) based on a fixed reference point or geographic boundaries as defined session location factor credentials.

FIG. 9 is an illustration of an example of interrogating personal computing device (D1) absolute location (L) based on a fixed reference point or geographic boundaries as defined session location factor credentials.

Figure 10:
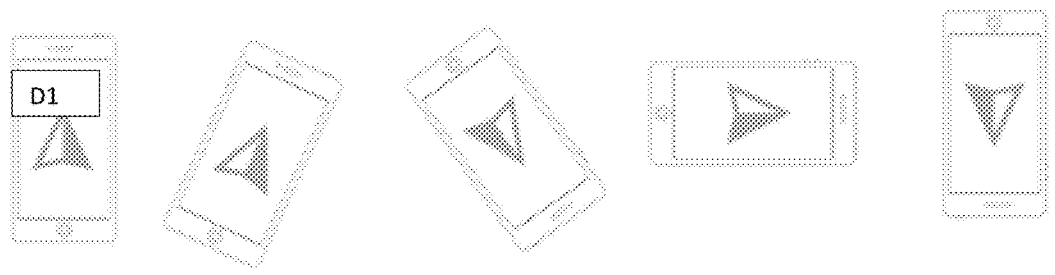
FIG. 10 is an illustration of an example of interrogating user (U1) behavior with respect to personal computing device (D1) orientation manipulation factor credentials during authentication, including absolute or relative orientation, movement or a combination of the two.

FIG. 10 is an illustration of an example of interrogating user (U1) behavior with respect to personal computing device (D1) orientation manipulation factor credentials during authentication, including absolute or relative orientation, movement or a combination of the two.

Figure 11:
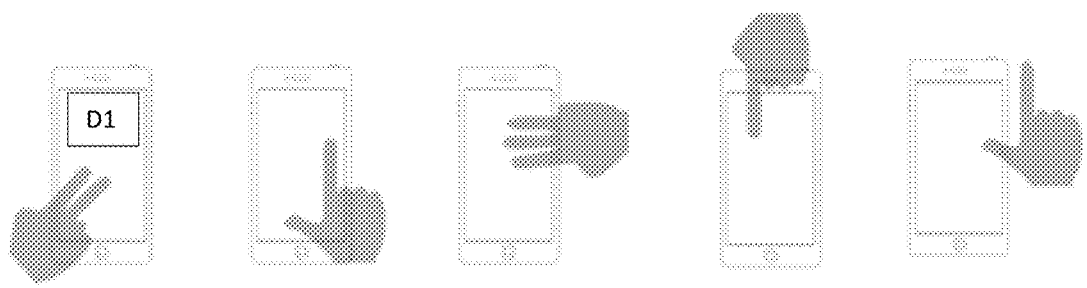
FIG. 11 is an illustration of an example of interrogating user (U1) behavior with respect to personal computing device (D1) manual multi-touch or gesture factor credentials during authentication, including fixed touch behavior, movement or gesture, or a combination thereof.

FIG. 11 is an illustration of an example of interrogating user (U1) behavior with respect to personal computing device (D1) manual multi-touch or gesture factor credentials during authentication, including fixed touch behavior, movement or gesture, or a combination thereof.

Figure 12:
FIG. 12 is an illustration of a general wireframe example of application (A1) state changes on a personal computing device (D1) through one embodiment of an authentication flow including: session initiation, rollover or scan to interrogate context factors, status determination and eventual acceptance or rejection.

FIG. 12 is an illustration of a general wireframe example of application (A1) state changes on a personal computing device (D1) through one embodiment of an authentication flow including: session initiation 101, rollover or scan to interrogate context factors 103, status determination 105, possible rejection 105 or acceptance 107, and, if accepted, sharing the secured and desired content 109.

EXAMPLES

Example #1

The first example involves a defense-in-depth scenario whereby the system and method of the present disclosure provides a layer of peer-to-peer authentication for accessing hosted resources or content on top of native identity management enforcement. The primary user (U1) places secured content (C1) on a social network site (P1) specifying access that requires additional authentication via the security system, over and above the native host (P1) site security. As shown in FIG. 1, User (U1) from device (D1) creates and tags secured content (C1) with the authentication request object and posts it to a social networking site (P1) in a generally inaccessible form, reciting that specific users or groups may have access, over and above the visibility rules afforded by the social network's native identity management security mechanisms and permissions. A secondary user (UN) on mobile or fixed personal computing device (DN) engages the social network (P1) and accesses the content (C1) at host presentation point (P1) via their personal computing device (DN). Upon engagement and authorization attempt, the authentication request object via (C1) trigger calls (or otherwise connects to or signals) the authentication server (S1) with a request to authenticate the user or groups of users (UN) and device(s) (DN) for the content (C1), in context. Server (S1) returns an authentication object for consumption and processing by the secondary user(s) (UN) on device(s) (DN) via app to interactively contextually authenticate (CX1) with (S1) as configured by the policies and/or specifics of the request, which may be the identification of device, behavior, touch, gesture, proximity, or knowledge. Both the server (S1) and device (D1) via the authentication app may independently triangulate, measure and validate the common context integrity, resulting in a contextual authentication decision that enables or denies user(s) (UN) access to that content (C1) on the host via presentation (P1). If the user(s) (UN) and device(s) (DN) are successfully authenticated in context by server (S1), the secured content (C1) on the social network site is rendered by permission specifically for user(s) (UN) or device(s) (DN).

Example #2

The second example involves multi-factor authentication to receive or engage transmitted content between users, generally shown in FIG. 2. A primary user (U1) who sends an email or other message (text, DM, tweet, etc.) (C1) from device (D1) with secured content or authentication tagging to one or more second users (UN) on device(s) (DN), over a shared communication channel, may require contextual authentication to access, retrieve, or view on device(s) (DN). Upon receipt or attempted access by user(s) (UN) to engage the content (C1) on device (DN), the authentication server is called by the authentication object in the tagged and secured content to request a contextual authentication. The rest of the process continues as detailed in Example #1 above. The resultant contextual authentication (CX1) passage or failure by user(s) (UN) on device(s) (DN) either allows or denies user(s) (UN) access to, rendering of, or engagement with the content (C1) on device(s) (DN), regardless of the intermediary permission of the host or app credentials, identities, or policies.

Example #3

The third example involves the system and method of the present disclosure providing a layer of defense-in-depth, multi-factor security between directly connecting endpoints or peer users on personal computing devices. A user (U1) on a fixed or mobile device (D1) who is directly connecting to a second user (UN) on another fixed or mobile device (DN) via a peer to peer application protocol such as VOIP, chat, or another app to app, device to device connection that exchanges data or provides shared access. In this case, the first user (U1) on device (D1) fires up a VOIP connection to a secondary user (UN) on their device (DN) according to the native VOIP user rules, identity addressing and permissions. The first user (U1) tags the connection with the authentication object and upon consumption of the connection, the second user must perform a contextual authentication from their device (DN) via the authentication server (S1) as per the flow detailed in Example #1 and/or Example #2, but with a direct triangulation of channels and validation among user (U1) on (D1), the authentication server (S1), and user (UN) on (DN). The resultant passage or failure to authenticate renders the VOIP connection valid and alive or terminated at the behest of user (U1) on device (D1) by nature of failing to authenticate the context (CX) of the other user (UN) and their device (DN), regardless of intermediary VOIP policies or identity management protocols.

Example #4

A fourth example involves a user requiring multiple users to contextually authenticate to authorize common access to a shared resource in a one-to-many scenario. As with the prior examples, a primary user (U1) on device (D1) wishes to publish or send content, or engage one or more connections with secondary users (UN) on devices (DN) and securely tags those connections or content with the authentication object. Upon consumption by one more secondary users, the common context authentication (CX1) performed by the users (UN) on devices (DN) is sent to and processed by the authentication server (S1) via the process detailed in Example #'s 1 and 2, providing passage or failure of that authentication. Access to or engagement with the secured resource, content, or connection can be authorized or denied to one, some, or all of the secondary users (UN) on devices (DN) by the primary peer user (U1) on device (D1) based on one or more authentication credential criteria or a holistic view of the entire contextual authentication (CX). As with all examples, the system and method of the present disclosure may provide the primary user (U1) or host (H1) with additional synchronous or asynchronous, private authentication control over resource, connection, or event engagement by one or more users on additional devices, over and above native identity, single-sign-on, federated identity, or other protocols.

In a broad embodiment of the system and method of the present disclosure, it is preferably applied as a layer of authentication security above username and password, single-sign-on or social login implementations as a multi-factor or defense-in-depth approach to establishing trust, authenticity and context of networked peer-to-peer users and their mobile devices engaging directly or indirectly with each other, as members of a website, application, network, computer hardware, computer software or computer game session or via the asynchronous publishing and consumption of independent but securable content, resources or data via website, blog, email, social network, instant message, file transfer, or API communication.

In another embodiment, the present security system could be used to anonymously or privately authenticate two or more users engaging or interacting in a physical, digital, or mixed reality setting via mutual multi-factor authentication through the mobile computing devices and the context in which they coexist. An example would be users utilizing a dating app who meet in person and use the mobile devices to multi-factor authenticate that each other are valid, genuine and authentic against previous digital identity assumptions but without revealing or exposing personal information or additional identity details.

In another embodiment, the present security system could be used standalone as a sole means of identifying and authenticating a peer user or device against a server, website or application where the users require additional identity security on top of what is natively provided or afforded.

Another embodiment involves the application of this present security system to enforce authentication for peer users accessing physical locations protected by locked entry, capable of interface with a mobile electronic computing device via line of sound, sight, sensation, NFC and textual data entry or biometric command, such as a door, window, vehicle or vault.

Another embodiment involves establishing authentication context verification to support a peer-to-peer electronic payment, form submission, access, modification, interaction or execution of a process within a program, website, app, server, network or session where login/identity is not the goal, but in-process anonymous, private verification, entitlement or authorization of an action by a previously identified and/or authenticated user or device.

Another embodiment involves the implementation of the present security system in a media environment (set-top device, television, display, cinema, open-air audio, broadcast, live event, gaming console) where peer mobile users can interact to authenticate the users/devices/locations/behavioral contexts to enable access, share content, enable interaction or entitle engagement with the media, game or content. An example would be a hotel room or store with a set-top DVR or broadcast capability, access to which is authorized through authentication by the present security system.

Yet another embodiment involves the application of the present security system with paper or printed materials for real-time authentication and payment processing, proof of receipt or acknowledgment, verification of attendance, access or permission to entry or engagement with the content, location or assets symbolized by the printed material between peer users. Users can initiate and validate the material and are authenticated in context of the location, device, user, session and other factors. Example would be sending a secure PDF, package, fax or document between peers for asynchronous validation and authentication.

Another embodiment involves the use of multiple, simultaneous applications of the present authentication system to co-authenticate overlapping contexts to provide mutual peer to peer access to a common asset, location or resource by multiple users, devices or locations.

Another embodiment involves utilizing the present security system technology to provide authentication control over social media, content and connections, over and above the native social network security mechanisms, to provide granular and time-extended user control over authenticated peer context access, download and engagement with that content or connections.

Another embodiment involves the use of peer remote authorizers and operators seeking access and permission to operate a vehicle, equipment or other device. The operator would request access to the vehicle or device through simple engagement with possession of and/or proximity to a personal computing electronic computing device. The remote authorizer possesses a similar personal computing device context. Upon operator vehicle engagement and access, the present security system mutually authenticates both authorizer and operator in context of the vehicle or device, ideally through one or more of the interactive verification methods per the present description and vehicle access and engagement is either approved or denied.

These examples are merely illustrative of and not limited to the total options and possibilities of applying the system and method of the present disclosure to alternate, new and emerging technologies and capabilities with respect to user or device behavior, context, location or customization.

While the foregoing written description of the system and method of the present disclosure enables one of ordinary skill to make and use what is considered presently to be the best mode thereof, those of ordinary skill will understand and appreciate the existence of variations, combinations, and equivalents of the specific embodiment, method, and examples herein. The system and method of the present disclosure should therefore not be limited by the above described embodiment, method, and examples, but by all embodiments and methods within the scope and spirit of the present security system as claimed.

While the foregoing written description of the present security system enables one of ordinary skill to make and use what is considered presently to be the best mode thereof, those of ordinary skill will understand and appreciate the existence of variations, combinations, and equivalents of the specific embodiment, method, and examples herein. The system and method of the present disclosure should therefore not be limited by the above described embodiment, method, and examples, but by all embodiments and methods within the scope and spirit of the present security system as claimed.

The foregoing description of the preferred embodiment of the present security system has been presented for the purposes of illustration and description. While multiple embodiments are disclosed, still other embodiments of the system and method of the present disclosure will become apparent to those skilled in the art from the above detailed description, which shows and describes illustrative embodiments of the system and method of the present disclosure. As will be realized, the present security system is capable of modifications in various obvious aspects, all without departing from the spirit and scope of the system and method of the present disclosure. Accordingly, the detailed description is to be regarded as illustrative in nature and not restrictive. Also, although not explicitly recited, one or more embodiments of the system and method of the present disclosure may be practiced in combination or conjunction with one another. Furthermore, the reference or non-reference to a particular embodiment of the present security system shall not be interpreted to limit the scope the system and method of the present disclosure. It is intended that the scope of the system and method of the present disclosure not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A contextual authentication system, comprising:
an authentication server, which comprises a memory; and
an authentication application, wherein said authentication application is configured to be run on at least a primary personal computing device and one or more secondary personal computing devices;
wherein said primary personal computing device and said one or more secondary personal computing devices are networked with an intermediate host;
wherein said intermediate host comprises a presentation;
wherein said presentation comprises one or more tagged resources;
wherein said intermediate host, via a second channel, presents said one or more tagged resources to said one or more secondary personal computing devices;
wherein a direct connection is initiated between said primary personal computing device and said one or more secondary personal computing devices;
wherein said authentication application running on said primary personal computing device creates said one or more tagged resources associated with an authentication request object that requires one or more contextual authentications to be accessed;
wherein said server sends to said one or more secondary personal computing devices said one or more tagged resources associated with said authentication request object; and
wherein said authentication application on said one or more secondary personal computing devices requires one or more users to provide one or more provided contextual authentications when said one or more tagged resources are accessed by said one or more secondary personal computing devices.

2. The system of claim 1, wherein said authentication server receives said one or more provided contextual authentications and determines whether said one or more provided contextual authentications are valid.

3. The system of claim 2, wherein if a particular provided contextual authentication is not valid, then said authentication server denies access to said one or more tagged resources.

4. The system of claim 2, wherein if a particular provided contextual authentication is valid, then said authentication server grants access to said one or more tagged resources.

5. The system of claim 2, wherein said one or more contextual authentications are interactive.

6. The system of claim 2, wherein said one or more contextual authentications are selected from the group of contextual authentications consisting of: device identification; a behavior; a touch; a gesture; proximity; and knowledge.

7. The system of claim 1, wherein said server creates a first template and a second template, which are stored in said memory;
wherein said server processes said first template;
wherein said one or more secondary personal computing devices each process said second template;
wherein said one or more secondary personal computing devices retrieve said second template by following said one or more tagged resources;
wherein said second template is retrieved independent of said server via a third channel;
wherein said primary personal computing device sets said one or more contextual authentications;
wherein said server populates said first template based on said one or more contextual authentications, such that a one-time contextual server signature is constructed by said server based on said first template;
wherein said authentication application on said one or more secondary computing devices populates said one or more provided contextual authentications into said second template, such that a one-time contextual device signature is constructed; and
wherein said server compares said one-time contextual server signature with said one-time contextual device signature and determines whether to grant access to said one or more tagged resources.

8. The method of claim 1, wherein said one or more secondary personal computing devices are enabled to retrieve said second template based on said one or more secondary personal computing devices' ability to scan, sense, enter, input, consume or respond to said one or more tagged resources on said intermediate host.

9. The method of claim 1, said primary personal computing device and said intermediate host each require an individual and discrete authentication with said one or more secondary personal computing device.

10. The method of claim 7, said primary personal computing device and said intermediate host each requiring an individual and discrete authentication with said secondary personal computing device.

11. A contextual authentication system, comprising:
an authentication server, which comprises a memory; and
an authentication application, wherein said authentication application is configured to be run on at least a primary personal computing device and one or more secondary personal computing devices;
wherein said primary personal computing device and said one or more secondary personal computing devices are networked with each other and with said authentication server;
wherein said primary personal computing device comprises one or more resources;
wherein a direct connection is initiated between said primary personal computing device and said one or more secondary personal computing devices;
wherein said authentication application running on said primary personal computing device tags one or more resources associated with an authentication request object that requires one or more contextual authentications;
wherein said primary personal computing device and said one or more secondary personal computing devices are networked with an intermediate host;
wherein said intermediate host comprises a presentation;
wherein said presentation comprises one or more tagged resources;
wherein said intermediate host, via a second channel, presents said one or more tagged resources to said one or more secondary personal computing devices;
wherein said server sends to said one or more secondary personal computing devices said one or more tagged resources associated with said authentication request object; and
wherein said authentication application on said one or more secondary personal computing devices requires one or more users to provide one or more provided contextual authentications when said one or more tagged resources are accessed by said one or more secondary personal computing devices.

12. The system of claim 11, wherein said authentication server receives said one or more provided contextual authentications and determines whether said one or more provided contextual authentications are valid.

13. The system of claim 12, wherein if a particular provided contextual authentication is not valid, then said authentication server denies access to said one or more tagged resources.

14. The system of claim 12, wherein if a particular provided contextual authentication is valid, then said authentication server grants access to said one or more tagged resources.

15. The system of claim 12, wherein said one or more contextual authentications are interactive.

16. The system of claim 12, wherein said one or more contextual authentications are selected from the group of contextual authentications consisting of: device identification; a behavior; a touch; a gesture; proximity; and knowledge.

* * * * *